US012614111B2

(12) United States Patent
Qiao et al.

(10) Patent No.: US 12,614,111 B2
(45) Date of Patent: Apr. 28, 2026

(54) MACHINE LEARNING TECHNIQUES FOR USER GROUP BASED CONTENT DISTRIBUTION

(71) Applicant: Google LLC, Mountain View, CA (US)

(72) Inventors: Yi Qiao, San Jose, CA (US); Arne Mauser, Los Altos Hills, CA (US); Chao Wang, Santa Clara, CA (US); Yizhong Liang, Sunnyvale, CA (US); Wei Huang, Kirkland, WA (US)

(73) Assignee: Google LLC, Mountain View, CA (US)

( * ) Notice: Subject to any disclaimer, the term of this patent is extended or adjusted under 35 U.S.C. 154(b) by 809 days.

(21) Appl. No.: 17/996,574

(22) PCT Filed: Oct. 28, 2021

(86) PCT No.: PCT/US2021/057028
§ 371 (c)(1),
(2) Date: Oct. 19, 2022

(87) PCT Pub. No.: WO2023/075774
PCT Pub. Date: May 4, 2023

(65) Prior Publication Data
US 2023/0259815 A1      Aug. 17, 2023

(51) Int. Cl.
*G06N 20/00*          (2019.01)

(52) U.S. Cl.
CPC .................................... *G06N 20/00* (2019.01)

(58) Field of Classification Search
CPC ...... G06N 20/00; G06N 3/0455; G06N 3/096; G06F 21/6245; G06F 16/9535
See application file for complete search history.

(56) References Cited

U.S. PATENT DOCUMENTS

2014/0274022 A1     9/2014   Bell et al.
2021/0042357 A1     2/2021   Wang et al.

OTHER PUBLICATIONS

International Search Report and Written Opinion in International Appln. No. PCT/US2021/057028, mailed on Jun. 27, 2022, 16 pages.
Li et al., "Ensemblenet: End-to-end optimization of multi-headed models" submitted on May 2019, arXiv:1905.09979v2, 11 pages.
Xu et al., "Survey on multi-output learning," IEEE Transactions on Neural Networks and Learning Systems, submitted on Nov. 2019, arXiv: 1901.00248v2, 1-21.
International Preliminary Report on Patentability in International Appln. No. PCT/US2021/057028, mailed on May 10, 2024, 10 pages.

*Primary Examiner* — Pei Yong Weng
(74) *Attorney, Agent, or Firm* — Fish & Richardson P.C.

(57)          ABSTRACT

Methods, systems, and apparatus, including computer programs encoded on a computer storage medium, for training and using machine learning models. In some aspects, a method includes identifying a first set of data for users of multiple user groups. For each user, a first party user identifier is obtained that identifies the individual user to a first party content provider. A second set of data describing activity of the user with respect to content of the first party content provider is identified. For each user, a contextual analysis of the first set and the second set of data is performed to generate one or more labels indicating user interest. A training dataset is generated based on the first set and the second set of data and a label. The training dataset is then used to train one or more machine learning models to predict user interest.

17 Claims, 5 Drawing Sheets

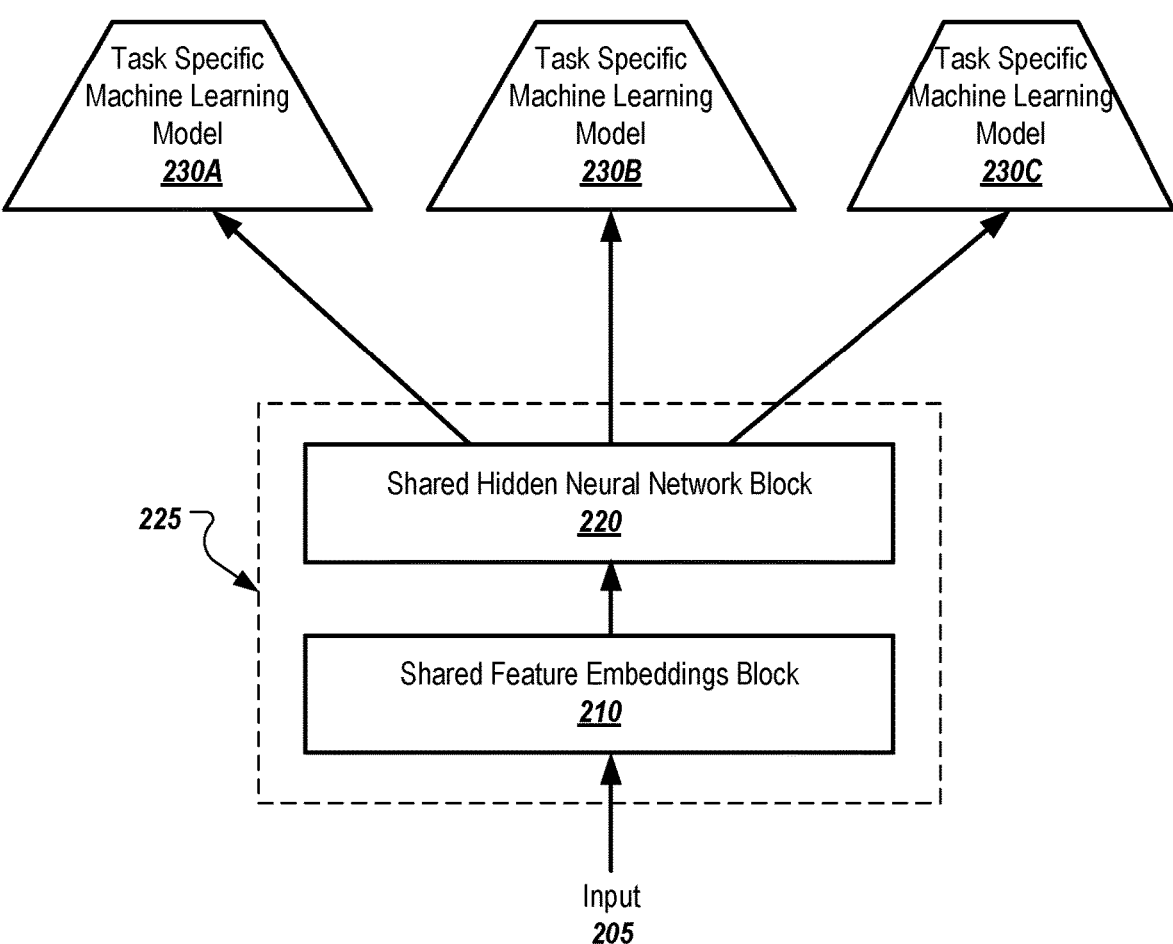
FIG. 2

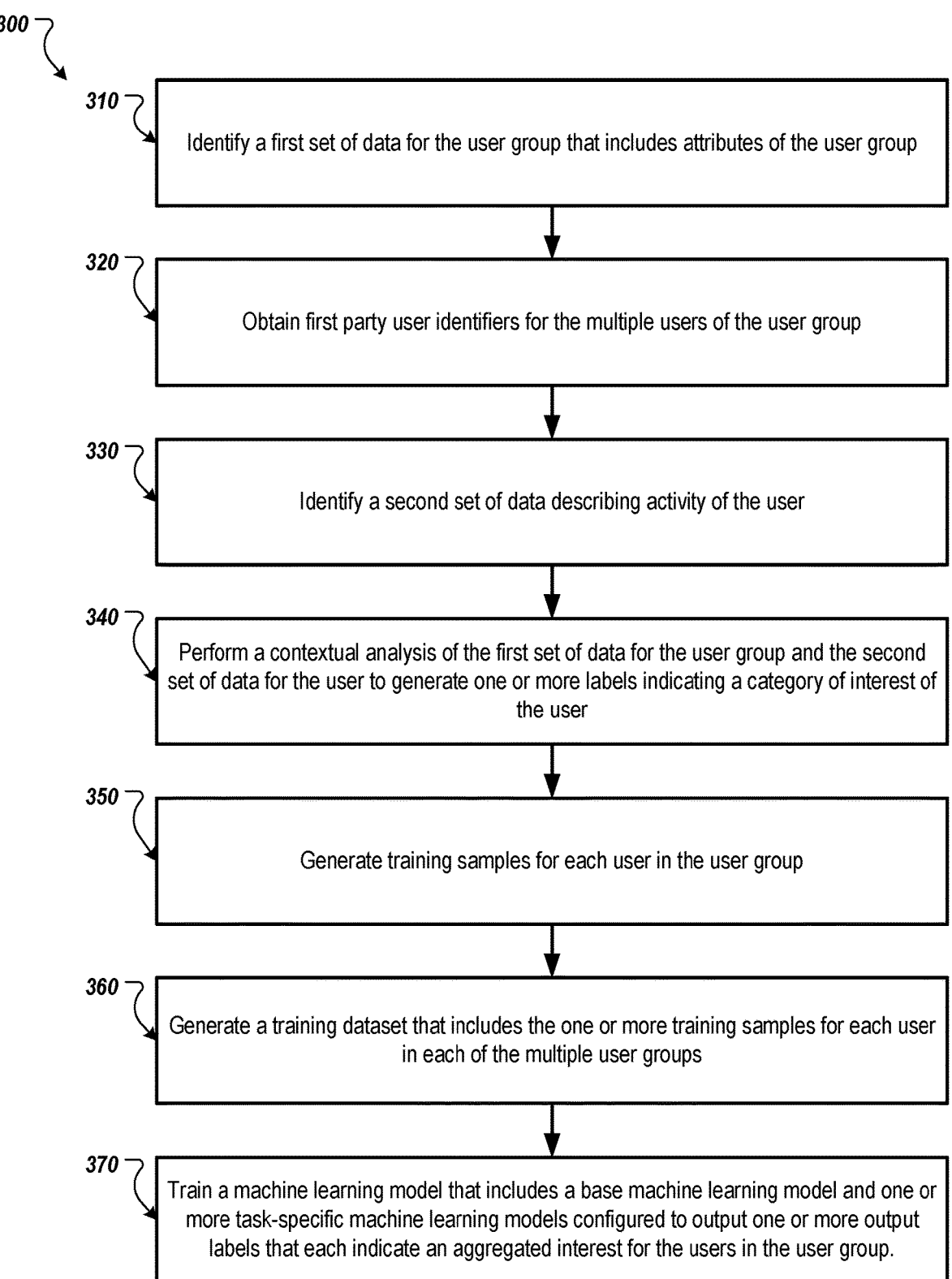

*300*

*310*   Identify a first set of data for the user group that includes attributes of the user group

*320*   Obtain first party user identifiers for the multiple users of the user group

*330*   Identify a second set of data describing activity of the user

*340*   Perform a contextual analysis of the first set of data for the user group and the second set of data for the user to generate one or more labels indicating a category of interest of the user

*350*   Generate training samples for each user in the user group

*360*   Generate a training dataset that includes the one or more training samples for each user in each of the multiple user groups

*370*   Train a machine learning model that includes a base machine learning model and one or more task-specific machine learning models configured to output one or more output labels that each indicate an aggregated interest for the users in the user group.

FIG. 3

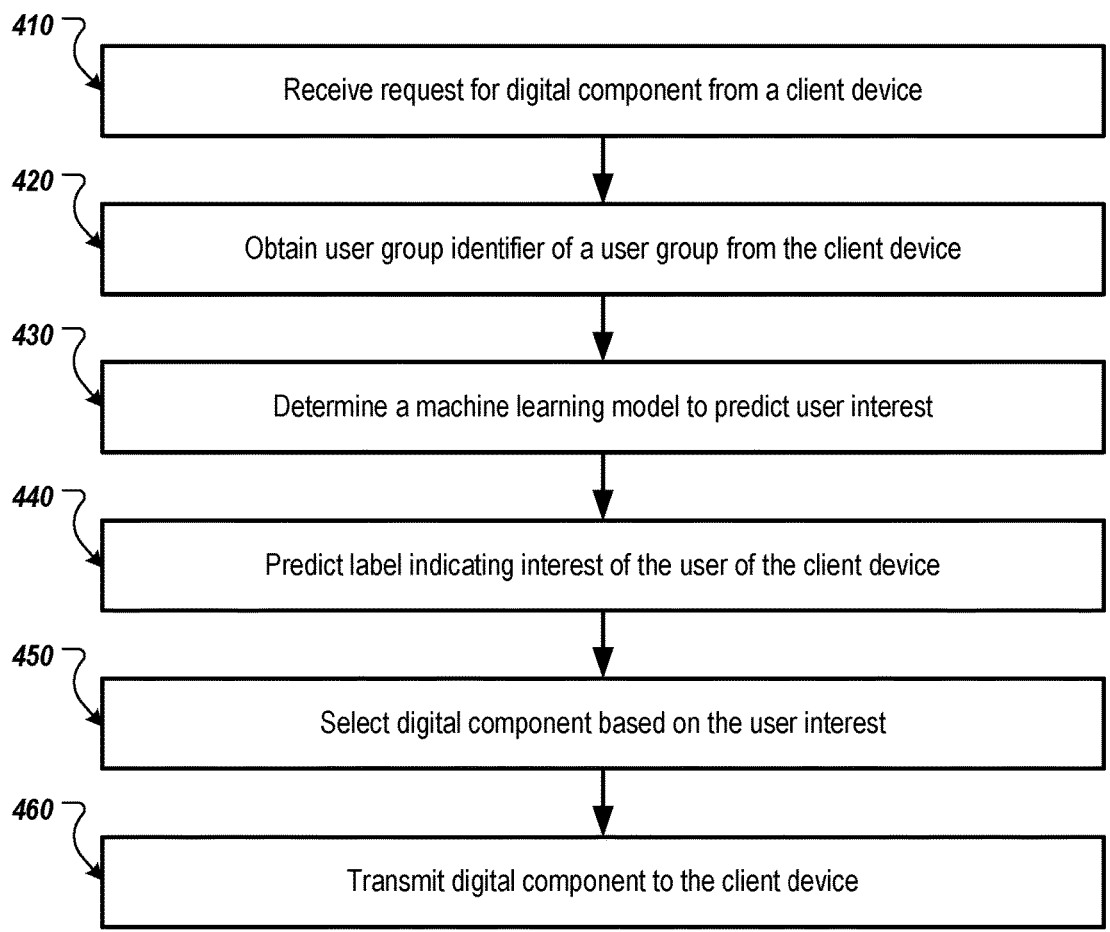
400
410 — Receive request for digital component from a client device
420 — Obtain user group identifier of a user group from the client device
430 — Determine a machine learning model to predict user interest
440 — Predict label indicating interest of the user of the client device
450 — Select digital component based on the user interest
460 — Transmit digital component to the client device
FIG. 4

500

Processor
510

520

Memory

550

Storage
Device
530

540

Input/Output

560

Peripheral
Devices

MACHINE LEARNING TECHNIQUES FOR USER GROUP BASED CONTENT DISTRIBUTION

CROSS-REFERENCE TO RELATED APPLICATIONS

This application is a National Stage Application under 35 U.S.C. § 371 and claims the benefit of International Application No. PCT/US2021/057028, filed Oct. 28, 2021. The disclosures of the foregoing application is hereby incorporated by reference in its entirety.

TECHNICAL FIELD

This specification relates to data processing and machine learning.

BACKGROUND

A client device can use an application (e.g., a web browser, a native application) to access a content platform (e.g., a search platform, a social media platform, or another platform that hosts content). The content platform can display, within an application launched on the client device, digital components (a discrete unit of digital content or digital information such as, e.g., a video clip, an audio clip, a multimedia clip, an image, text, or another unit of content) that may be provided by one or more content source/ platform.

SUMMARY

In general, one innovative aspect of the subject matter described in this specification can be embodied in methods including the operations of identifying, for each user group of a plurality of user groups that each include multiple users classified as having similar interests, a first set of data that includes a first set of attributes of the user group; for each user group of the multiple user groups: obtaining first party user identifiers for the multiple users of the user group, where the first party user identifier for an individual user identifies the individual user to a first party content provider; identifying, for each user in the user group, a second set of data describing activity of the user with respect to content of the first party content provider; performing, for each user in the user group, a contextual analysis of the first set of data for the user group and the second set of data for the user, thereby generating one or more labels indicating a category of interest of the user; and generating one or more training samples for each user in the user group, the generating including, for each label of the one or more labels for each user in the user group, combining at least a portion of the first set of data for the user group, the second set of data for the user, and the label; generating a training dataset that includes the one or more training samples for each user in each of the multiple user groups; and training, using the training dataset, to generate a trained machine learning model comprising (1) a base machine learning model configured to generate an encoded representation of the training samples, and (2) one or more task-specific machine learning models configured to receive as input, the encoded representation of the training samples and generate, as output, one or more output labels that each indicate an aggregated interest for the users in the user group.

Other embodiments of this aspect include corresponding systems, apparatus, and computer programs, configured to perform the actions of the methods, encoded on computer storage devices. These and other embodiments can each optionally include one or more of the following features.

Methods can further include receiving, from a client device of a given user, a digital component request, where the digital component request includes a given user group identifier of a given user group that includes the given user as a member; identifying a set of attributes for the given user group; providing the set of attributes for the given user group as input to the machine learning model; generating, using the trained machine leaning model, an output label that indicates an interest of the given user of the client device; selecting one or more digital components based on the output label of the given user; and transmitting the one or more digital components to the client device.

Methods can include the first set of data to include digital content accessed by the multiple users of each of the plurality of user groups.

Methods can include the second set of data for each of the multiple users of the plurality of user groups to include data indicating online activity of the user and user characteristics provided by each of the users to a first party content provider that provides digital content to the users.

Methods can include training the machine learning model by training the base machine learning model on the training dataset to generate a set of features that is an intermediate representation of the first set of features and the second set of features; and training each of the one or more task-specific machine learning models for selecting digital components based on the set of features at different levels of accuracy.

Methods can include training each of the task-specific machine learning models by providing the set of features generated by the base machine learning model as input to each of the task-specific machine learning models.

Methods can include each of the task-specific machine learning model to be trained on a different loss function corresponding to a different level of content personalization than each other task-specific machine learning model.

Particular embodiments of the subject matter described in this specification can be implemented so as to realize one or more of the following advantages. The subject of online privacy is more important as more Internet users are beginning to care about the privacy of their online activities. To respect the privacy requirements, content providers and digital component providers are coming up with new ways of delivering digital content without using cookies. The techniques and methods discussed in this document distribute digital components to users, by assigning the users to user groups in ways that preserve individual users' privacy, but these techniques may lack the capability of selecting and delivering highly personalized digital components. The techniques and methods described in this document learn intricate relationships between user-specific information and user groups that can be used to select and distribute personalized digital content, such as digital components. The techniques then transfer the learned concepts to an environment when user-specific information such as cookies are unavailable thereby allowing selection and delivery of personalized digital components without using user-specific information, thereby maintaining user privacy.

Other advantages of such techniques and methods include the selection and delivery of personalized digital components in a shorter time frame using fewer computational resources such as network bandwidth and memory requirements on the client devices. For example, the client devices do not need to store cookies which further eliminates the need to transmit the cookies to the content providers thereby reducing network bandwidth. Since the learned concepts such as the relationships between user-specific information, user groups and digital components, are readily available, digital components can be selected and transmitted to the client devices without having to wait for the client devices to transmit cookies to the digital component providers and the digital component providers to process the information of the cookies to select digital components prior to transmitting the digital components to the client device.

Additional advantages of such techniques and methods include training of multiple machine learning models in a way that each model can be further trained on specific tasks (for e.g., different levels of personalization) without having to re-train the entire machine learning model thereby reducing computational resources. After training the machine learning models, the methods allow selection of one or more machine learning models from the multiple trained machine learning models or a machine learning model configuration depending upon the availability of data that can be used to predict user interest and deliver digital components via the training machine learning model at different levels of user personalization. This provides the content providers and digital content providers to provide digital components with an option of selecting between the levels of user personalization based on business rules. The methods further provide the user with an option to manage user preference of personalization by selecting between the trained machine learning models thereby also giving an option to the user to control the use of user related data that may otherwise be used by digital component providers to select and provide digital components.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 shows example machine learning models for selecting digital components.

FIG. 3 is a flow diagram of an example process of generating a training dataset and training a machine learning model to select digital components.

FIG. 4 is a flow diagram of an example process of selecting and distributing digital components.

DETAILED DESCRIPTION

Figure 1:
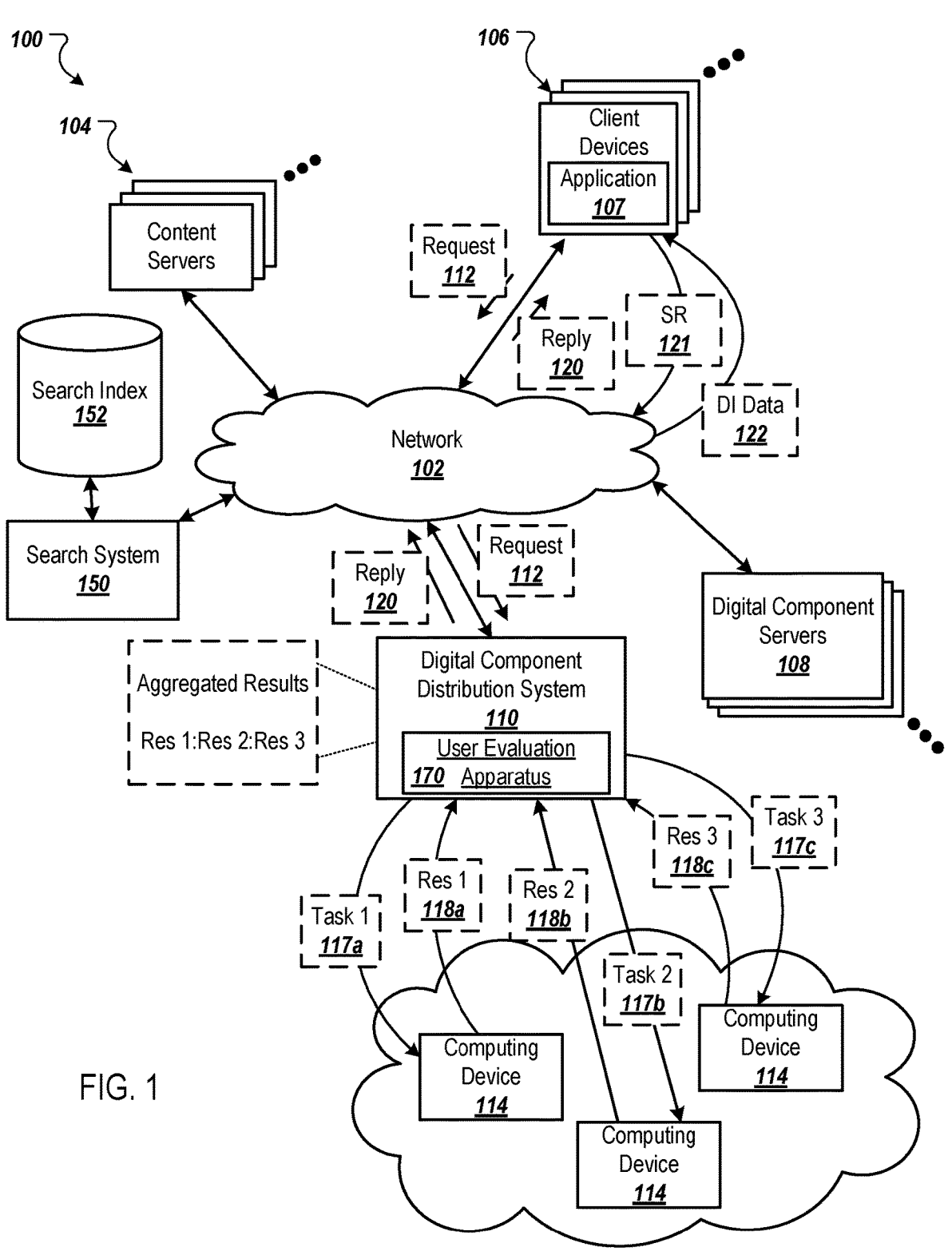
FIG. 1 is a block diagram of an example environment in which digital components are distributed.

This document describes machine learning techniques, and in particular transfer learning techniques, to train privacy preserving machine learning models. The training of the machine learning models can include, for example, generating training samples of a training dataset that can be used to implement machine learning models for selecting and distributing digital components, thereby providing a personalized user experience while preserving user privacy and data security. When used for selecting digital components for users, the machine learning models generate predictive results without using user-specific data, which can be private or sensitive, thereby maintaining user privacy.

In general, users connected to a public network, e.g., the Internet, via client devices can be provided with digital components. In such scenarios, the digital component provider may wish to provide digital components based on user-specific information, such as the user's online activity and user browsing history. However, due to privacy concerns, many users are opting out of allowing certain information to be collected and used, and third-party cookies are being blocked and/or deprecated by some browsers, such that digital component selection must be performed without the use of third-party cookies (i.e., cookies from a domain that differs from the domain of the web page permitted to access the contents of the cookie file and that track user's online activity across multiple domains).

To provide personalized content while maintaining user privacy in this changing landscape, new techniques are emerging that enable the distribution of digital components to users based on user groups to which the users belong rather than individual user data. These techniques can include assigning the users to user groups when the users visit particular resources or perform particular actions at the resource (e.g., interact with a particular item presented on a web page or add the item to a virtual cart). These user groups are generally created in a manner such that each user group includes a sufficient number of users, such that no individual user can be identified. In addition, the users can be assigned to the user groups without the user's data ever leaving the user's device, thereby precluding parties other than the user from accessing the user's sensitive and/or confidential data. User-specific information still remains important for providing users with personalized online experiences, e.g., by providing specific digital components that are relevant to the users. However, due to unavailability of such information, machine learning models can be implemented to select specific digital components that otherwise would require such user-specific information.

Even though such techniques of using machine learning models can select highly personalized digital components, these models can suffer greatly due to insufficient data while training and predicting. However, using user-specific information as inputs to the machine learning models has significant privacy concerns and risks the misuse of personal data. To mitigate these problems, the techniques described in this document can generate a training dataset by combining semantic data of the user groups and user-specific data, which can be anonymous user data such that no party can identify a particular user based on the user-specific data. After generating a machine learning model, the model can be used to predict digital components without using user-specific information. Instead, the input to the machine learning model can be a user group identifier that identifies a large group of users that includes the user as a member and possibly semantic data of the user group. The systems and techniques are further described with reference to FIGS. 1-4.

FIG. 1 is a block diagram of an example environment 100 in which digital components are distributed for presentation with electronic documents. The example environment 100 includes a network 102, such as a local area network (LAN), a wide area network (WAN), the Internet, or a combination thereof. The network 102 connects content servers 104, client devices 106, digital component servers 108, and a digital component distribution system 110 and the search system 150.

A client device 106 is an electronic device that is capable of requesting and receiving resources over the network 102. Example client devices 106 include personal computers, mobile communication devices, wearable devices, personal digital assistants, and other devices that can send and receive data over the network 102. A client device 106 typically includes a user application 107, such as a web browser, to facilitate the sending and receiving of data over the network 102, but native applications executed by the client device 106 can also facilitate the sending and receiving of data over the network 102. Client devices 106, and in particular personal digital assistants, can include hardware and/or software that enable voice interaction with the client devices 106. For example, the client devices 106 can include a microphone through which users can submit audio (e.g., voice) input, such as commands, search queries, browsing instructions, smart home instructions, and/or other information. Additionally, the client devices 106 can include speakers through which users can be provided audio (e.g., voice) output. A personal digital assistant can be implemented in any client device 106, with examples including wearables, a smart speaker, home appliances, cars, tablet devices, or other client devices 106. Client devices 106 can also include video streaming devices and gaming devices, e.g., gaming consoles.

An electronic document is data that presents a set of content at a client device 106. Examples of electronic documents include webpages, word processing documents, portable document format (PDF) documents, images, videos, search results pages, and feed sources. Electronic documents can be provided to client devices 106 by content servers 104. For example, the content servers 104 can include servers that host publisher websites. In this example, the client device 106 can initiate a request for a given publisher webpage, and the content server 104 that hosts the given publisher webpage can respond to the request by sending machine executable instructions that initiate presentation of the given webpage at the client device 106.

In another example, the content servers 104 can include app-servers from which client devices 106 can download apps. In this example, the client device 106 can download files required to install an app at the client device 106, and then execute the downloaded app locally. The downloaded app can be configured to present a combination of native content that is part of the application itself, as well as one or more digital components (e.g., content created/distributed by a third party) that are obtained from a digital component server 108, and inserted into the app while the app is being executed at the client device 106.

Electronic documents can include a variety of content. For example, an electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the client device 106 to request content from the data source when the given electronic document is processed (e.g., rendered or executed) by a client device 106. The client device 106 integrates the content obtained from the data source into the given electronic document to create a composite electronic document including the content obtained from the data source.

In some situations, a given electronic document can include a digital component tag or digital component script that references the digital component distribution system 110. In these situations, the digital component tag or the digital component script is executed by the client device 106 when the given electronic document is processed by the client device 106. Execution of the digital component tag or digital component script configures the client device 106 to generate a request for digital components 112 (referred to as a "component request"), which is transmitted over the network 102 to the digital component distribution system 110. For example, the digital component tag or digital component script can enable the client device 106 to generate a packetized data request including a header and payload data. The digital component request 112 can include event data specifying features such as a name (or network location) of a server from which media is being requested, a name (or network location) of the requesting device (e.g., the client device 106), and/or information that the digital component distribution system 110 can use to select one or more digital components provided in response to the request. The component request 112 is transmitted, by the client device 106, over the network 102 (e.g., a telecommunications network) to a server of the digital component distribution system 110.

The digital component request 112 can include event data specifying other event features, such as the electronic document being requested and characteristics of locations of the electronic document at which digital component can be presented. For example, event data specifying a reference (e.g., Uniform Resource Locator (URL)) to an electronic document (e.g., webpage or application) in which the digital component will be presented, available locations of the electronic documents that are available to present digital component, sizes of the available locations, and/or media types that are eligible for presentation in the locations can be provided to the digital component distribution system 110. Similarly, event data specifying keywords associated with the electronic document ("document keywords") or entities (e.g., people, places, or things) that are referenced by the electronic document can also be included in the component request 112 (e.g., as payload data) and provided to the digital component distribution system 110 to facilitate identification of digital component that are eligible for presentation with the electronic document. The event data can also include a search query that was submitted from the client device 106 to obtain a search results page and/or data specifying search results and/or textual, audible, or other visual content that is included in the search results.

Component requests 112 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 112 can be transmitted, for example, over a packetized network, and the component requests 112 themselves can be formatted as packetized data having a header and payload data. The header can specify a destination of the packet and the payload data can include any of the information discussed above.

The digital component distribution system 110, which includes one or more digital component distribution servers, chooses digital components that will be presented with the given electronic document in response to receiving the component request 112 and/or using information included in the component request 112. In some implementations, a digital component is selected in less than a second to avoid errors that could be caused by delayed selection of the digital component. For example, delays in providing digital component in response to a component request 112 can result in page load errors at the client device 106 or cause portions of the electronic document to remain unpopulated even after other portions of the electronic document are presented at the client device 106. Also, as the delay in providing the digital component to the client device 106 increases, it is more likely that the electronic document will no longer be presented at the client device 106 when the digital component is delivered to the client device 106, thereby negatively impacting a user's experience with the electronic document. Further, delays in providing the digital component can result in a failed delivery of the digital component, for example, if the electronic document is no longer presented at the client device 106 when the digital component is provided.

To avoid any delays in providing digital component, the digital component distribution system 110 can implement one or more machine learning models according to the techniques and methods described in this document that allow learning of complex relationships between the user and the user interest. Implementing such machine learning models to predict user interest allow the digital component distribution system 110 to select digital components without having to communicate with the client device 106 for user specific data (for e.g., cookies) stored on the client device 106 that would otherwise require both network bandwidth and time. The digital component distribution system 110 can use the machine learning models to predict user interest and select digital components based on the predicted user interest that can be transmitted to the client device 106 instantaneously.

To facilitate searching of electronic documents, the environment 100 can include a search system 150 that identifies the electronic documents by crawling and indexing the electronic documents (e.g., indexed based on the crawled content of the electronic documents). Data about the electronic documents can be indexed based on the electronic document with which the data are associated. The indexed and, optionally, cached copies of the electronic documents are stored in a search index 152 (e.g., hardware memory device(s)). Data that are associated with an electronic document is data that represents content included in the electronic document and/or metadata for the electronic document.

Client devices 106 can submit search queries to the search system 150 over the network 102. In response, the search system 150 accesses the search index 152 to identify electronic documents that are relevant to the search query. The search system 150 identifies the electronic documents in the form of search results and returns the search results to the client device 106 in search results page. A search result is data generated by the search system 150 that identifies an electronic document that is responsive (e.g., relevant) to a particular search query, and includes an active link (e.g., hypertext link) that causes a client device to request data from a specified location in response to user interaction with the search result. An example search result can include a web page title, a snippet of text or a portion of an image extracted from the web page, and the URL of the web page. Another example search result can include a title of a downloadable application, a snippet of text describing the downloadable application, an image depicting a user interface of the downloadable application, and/or a URL to a location from which the application can be downloaded to the client device 106. Another example search result can include a title of streaming media, a snippet of text describing the streaming media, an image depicting contents of the streaming media, and/or a URL to a location from which the streaming media can be downloaded to the client device 106. Like other electronic documents search results pages can include one or more slots in which digital components (e.g., advertisements, video clips, audio clips, images, or other digital components) can be presented.

In some implementations, the digital component distribution system 110 is implemented in a distributed computing system that includes, for example, a server and a set of multiple computing devices 114 that are interconnected and identify and distribute digital components in response to component requests 112. The set of multiple computing devices 114 operate together to identify a set of digital components that are eligible to be presented in the electronic document from among a corpus of potentially millions of available digital components.

In some implementations, the digital component distribution system 110 implements different techniques for selecting and distributing digital components. For example, digital components can include a corresponding distribution parameters that contribute to (e.g., condition or limit) the selection/distribution/transmission of the corresponding digital component. For example, the distribution parameters can contribute to the transmission of a digital component by requiring that a component request include at least one criterion that matches (e.g., either exactly or with some pre-specified level of similarity) one of the distribution parameters of the digital component.

In another example, the distribution parameters for a particular digital component can include distribution keywords that must be matched (e.g., by electronic documents, document keywords, or terms specified in the component request 112) in order for the digital components to be eligible for presentation. The distribution parameters can also require that the component request 112 include information specifying a particular geographic region (e.g., country or state) and/or information specifying that the component request 112 originated at a particular type of client device 106 (e.g., mobile device or tablet device) in order for the component item to be eligible for presentation. The distribution parameters can also specify an eligibility value (e.g., rank, score or some other specified value) that is used for evaluating the eligibility of the component item for selection/distribution/transmission (e.g., among other available digital components), as discussed in more detail below. In some situations, the eligibility value can be based on an amount that will be submitted when a specific event is attributed to the digital component item (e.g., presentation of the digital component).

The identification of the eligible digital components can be segmented into multiple tasks 117a-117c that are then assigned among computing devices within the set of multiple computing devices 114. For example, different computing devices in the set 114 can each analyze a different digital components to identify various digital components having distribution parameters that match information included in the component request 112. In some implementations, each given computing device in the set 114 can analyze a different data dimension (or set of dimensions) and pass (e.g., transmit) results (Res 1-Res 3) 118a-118c of the analysis back to the digital component distribution system 110. For example, the results 118a-118c provided by each of the computing devices in the set 114 may identify a subset of digital component items that are eligible for distribution in response to the component request and/or a subset of the digital components that have certain distribution parameters.

The identification of the subset of digital components can include, for example, comparing the event data to the distribution parameters, and identifying the subset of digital component having distribution parameters that match at least some features of the event data.

The digital component distribution system 110 aggregates the results 118a-118c received from the set of multiple computing devices 114 and uses information associated with the aggregated results to select one or more digital components that will be provided in response to the component request 112. For example, the digital component distribution system 110 can select a set of winning digital components (one or more digital components) based on the outcome of one or more digital component evaluation processes. In turn, the digital component distribution system 110 can generate and transmit, over the network 102, reply data 120 (e.g., digital data representing a reply) that enable the client device 106 to integrate the set of winning digital component into the given electronic document, such that the set of winning digital components and the content of the electronic document are presented together at a display of the client device 106.

In some implementations, the client device 106 executes instructions included in the reply data 120, which configures and enables the client device 106 to obtain the set of winning digital components from one or more digital component servers 108. For example, the instructions in the reply data 120 can include a network location (e.g., a URL) and a script that causes the client device 106 to transmit a server request (SR) 121 to the digital component server 108 to obtain a given winning digital component from the digital component server 108. In response to the server request 121, the digital component server 108 will identify the given winning digital component specified in the server request 121 and transmit, to the client device 106, digital component data 122 (DI Data) that presents the given winning digital component in the electronic document at the client device 106.

In some implementations, distribution parameters for digital component distribution may include user-specific information such as demographic information, user interests, and/or other information that can be used to personalize the user's online experience. In some situations, these characteristics and/or information regarding the user of the client device 106 is readily available. For example, content platforms such as the content server 104 or the search system 150 may allow the user to register with the content platform by providing such user-specific information. In another example, the content platform can use cookies to identify client devices, which can store information about the user's online activity and/or user-specific information. Historically, third party cookies have been used to provide user-specific information to the digital component distribution system 110 irrespective of what domain the user was visiting. However, these and other methods of identifying user-specific information are becoming less prevalent in an effort to protect user privacy. For example, browsers have been redesigned to actively block the use of third party cookies, thereby preventing the digital component distribution system 110 from accessing user-specific information unless the user is accessing a resource that is in the same domain as the digital component distribution system 110.

To protect user privacy, the users can be assigned to one or more user groups. For example, the users can be assigned to user interest groups based on the digital content accessed by the user during a single browsing session, or over multiple browsing sessions during a specified time period. For example, when the user visits a particular website and interacts with a particular item presented on the website or adds an item to a virtual cart, the user can be assigned to a user group for users who have visited the same website or other websites that are contextually similar, or are interested in the same item. For example, if the user of the client device 106 searches for shoes and visits multiple webpages of different shoe manufacturers, the user can be assigned to the user group "shoe," which can include all users who have visited websites related to shoes. Thus, the user groups can represent interests of the users in the aggregate without identifying the individual users and without enabling any individual user to be identified. For example, the user groups can be identified by a user group identifier that is used for every user in the group rather than using a unique identifier for each user. As an example, if a user adds shoes to a shopping cart of an online retailer, the user can be added to a shoes user group having a particular identifier, which is assigned to every user in the group.

The user's group membership can be maintained at the user's client device 106, e.g., by a browser-based application. Each user group can have a respective user group identifier that uniquely identifies the user group. The user group identifier for a user group can be descriptive of the group (e.g., gardening group) or a code that represents the group (e.g., an alphanumeric sequence that is not descriptive).

In some implementations, the assignment of a user to a user group is a temporary assignment since the user's group membership can change with a change in the user's browsing activity. For example, when the users starts a web browsing session and visits particular website and interacts with a particular item presented on the website or adds an item to a virtual cart, the user can be assigned to a group of users who have visited the same website or other websites that are contextually similar or are interested in the same item. However if the user visits another website and interacts with another type of item presented on the other website, the user is assigned to another group of users who have visited the other website or other websites that are contextually similar or are interested in the other item. For example, if the user starts the browsing session by searching for shoes and visiting multiple webpages of different shoe manufacturers, the user can be assigned to the user group "shoe," which includes all users who have visited websites related to shoes. Assume that there are 100 users who have previously visited websites related to shoes. When the user is assigned to the user group "shoe", the total number of users included in the user group increases to 101. However after some time if the user searches for hotels and visits multiple webpages of different hotels or travel agencies, the user can be removed from the previously assigned user group "shoe" and re-assigned to a different user group "hotel" or "travel". In such a case, the number of users in the user group "shoe", reduces back to 100 given if no other user was added or removed from the particular user group.

Because of the temporary nature of the user group assignment, the user groups are sometimes referred to as temporary user groups and the corresponding user group identifiers as temporary group identifiers.

In some implementations, the number and types of user groups is managed and/or controlled by a system (or administrator). For example, the system may implement an algorithmic and/or machine learning method to oversee the management of the user groups. In general, since the flux of users who are engaged in an active browser session changes with time and since each individual user is responsible for their respective browsing activity, the number of user groups and number of users in each of the user groups changes with time. This method can be applied in such a way as to provide provable guarantees of privacy or non-identifiability of the individuals within each user group.

In some implementations, each user group can be characterized by multiple characteristics and/or attributes. For example, a user group can be attributed by the number of users in the group, the demographic distribution of users of the group, contents that are frequently accessed by the users of the group etc. In some implementations, content distribution system 110 that maintains and/or manages the user group membership of the users, can implement methods and techniques to predict user characteristics that are generally unknown due to unavailability of user-specific information. Since the user group membership is anonymous which means that users in the user groups cannot be individually identified, the predicted user characteristics do not violate user privacy.

For example, if a user of the client device 106 uses a browser-based application 107 to load a website that includes one or more digital component slots, the browser-based application 107 can generate and transmit a component request 112 for each of the one or more digital component slots. The component request 112 includes the user group identifier(s) corresponding to the user group(s) that includes an identifier for the client device 106, contextual information such as coarse geographic information indicating a state or region from which the component request 112 was submitted, or other information that provides context for the environment in which the digital component 112 will be displayed (e.g., a time of day of the component request, a day of the week of the component request, a type of client device 106 at which the digital component will be displayed, such as a mobile device or tablet device).

The digital component distribution system 110, after receiving the component request 112, provides the information included in the component request 112 as input to the machine learning model. The machine learning model, after processing the input, generates an output including a prediction of one or more user characteristics that were not included in the component request 112. These one or more user characteristics along with other information included in the component request can be used to select digital components for retrieval from the digital component server 108 and distribution to the client device 106 for display in the digital component slot.

To select digital components for distribution to the users on their client devices 106, the digital component distribution system 110 can include a user evaluation apparatus 170 that selects digital components. Historically, the selection of digital components was often based on information aggregated using third party cookies and/or digital component requests 112 that includes user-specific information. However, when such information is not available, for example because third party cookies are blocked or otherwise deprecated, the user evaluation apparatus 170 can implement one or more machine learning models that can be used to predict labels for the users by processing data that may not include user-specific information. For example, the user evaluation apparatus 170 can implement a machine learning model to predict labels indicating user interest and then based on the predicted labels, the component distribution system 110 can select digital component for the user.

In some implementations, the machine learning models implemented by the evaluation apparatus 170 can be trained on a training dataset that can include information about the respective user groups of the users and user-specific information. This allows the machine learning models to learn the complex relationships between the different user-specific information (attributes) and the corresponding user groups. While selecting digital components, since the machine learning models do not use user-specific information, the user privacy is maintained without reducing the predictive efficiency of the machine learning models.

To generate a training dataset that can be used to train one or more machine learning model across different user groups, the evaluation apparatus 170 can identify the multiple user groups maintained and/or managed by the content distribution system 110 and data (referred to as a first set of data) about each of the user groups in the multiple user groups. For example, if there are 100 user groups, the evaluation apparatus 170 can obtain user group identifiers for each of the 100 user groups and a first set of data for each of the 100 user groups. The first set of data can include data regarding the user groups that do not identify individual users. This is due to the inherent nature of the how the user groups have been implemented. In some implementations, the first set of data for the user groups can include user group attributes such as the number of users in the user groups, the geographical locations of the client devices 106 of the users of the user groups, a set (or a list of URLs) of digital contents that are commonly accessed by the users of the user groups etc. The first set of data can further include the distribution of users based on certain user characteristics such as gender, income group, educational qualification that may have been obtained or predicted by other machine learning models implemented by the content distribution system 110.

In some implementations, the first set of data can further include along with various signals derived from the user group identifier such as the average characteristics or aggregate behavioral statistics of users within the group, and/or other information that provides context for the environment in which the digital component 112 will be displayed (e.g., a time of day of the component request, a day of the week of the component request, a type of client device 106 at which the digital component will be displayed, such as a mobile device or tablet device). For example, the average characteristics of the user groups can include a ratio of male to female users, ratio of different age groups of users in the user groups etc. The aggregate behavioral statistics can include patterns of online behavior of users and preferences to digital content including patterns in selection choices of users to digital content.

In some implementations, the evaluation apparatus 170 can obtain user identifiers for each of the users in each of the multiple user groups. These user identifiers can be first party user identifiers such as electronic mail (e-mail) identifiers or phone numbers that the user willingly provides to the content servers 104, e.g., in order to access content or services provided by the content servers 104. The evaluation apparatus 170 can further obtain user-specific information (referred to as the second set of data) such as online activity that can include digital content accessed by the user, the prior digital components distributed to the client device of the users and performance of user actions such as clicking and/or selecting digital components. In some implementations, the second set of data can further include user-specific information such as age, gender, level of education etc. that were provided by the users of the user groups. For example, a user can use a client device 106 to log into a video streaming service provided by a content server 104 using a first party user identifier such as an e-mail address. To provide the user with content based on the user group, the content server 104 can either request the user group identifier stored on the client device 106 or the client device 106 can willingly transmit the user group identifier to the content server 104. In any case, the client device 106 can transmit the user group identifier to the content server 104 thereby allowing the content server 104 to have access to the user group identifier, the user identifier and other user-specific information such as user's online activity. As for another example, a user can use a client device 106 to register to a search service (for e.g., service provided by the search system 150) using the user identifier such as email. While the user is searching and browsing through digital content provided by the search system 150, the client device 106 of the user is assigned to a user group based on the user's online activity and search history. To provide the user with search results and digital components based on the user group, the search system 150 can either request the user group identifier stored on the client device 106 or the client device 106 can willingly transmit the user group identifier to the content server 104. The client device 106 can transmit the user group identifier to the search system 150 thereby allowing the search system 150 to have access to the user group identifier, the user identifier and other user-specific information such as user's online activity and search history. Any content platform that maintains a history of a user's activity with the platform and that requests the user group identifier can correlate the users' activities with the user group identifiers in a similar manner.

In some implementations, the evaluation apparatus 170 after obtaining the first set of data and the second set of data can perform a contextual analysis of the first set and the second set to generate one or more labels that indicates user interests. For example, assume that a user is interested in travelling and the user uses client device 106 to search and access digital content related to hotels and travel tickets to a particular destination. Further assume that based on the user activity the user is assigned to a user group "Travel" that includes multiple users that are interested in travelling. The evaluation apparatus 170 can use natural language processing (NLP) to process the digital contents accessed by the user based the user's online activity and the digital contents accessed by the user to generate labels that indicate user interest. In this example, the labels generated by the evaluation apparatus 170 can be "Destination1" indicating that the user is interested in travelling to a particular destination1. In this example, the evaluation apparatus 170 can also generate other labels that can indicate user interest in other travel destinations, hotels or car rentals.

In some implementations, the evaluation apparatus 170 can generate a training dataset after generating the labels for each of the users across multiple user groups. For this, the evaluation apparatus 170 can generate training samples where each training sample corresponds to a particular user and can include the corresponding first set of data, the corresponding second set of data and one of the labels generated by the evaluation apparatus 170. For example, if for a particular user, the evaluation apparatus 170 generates two labels, the evaluation apparatus 170 can generate two training samples where the first sample will include the first of the two labels and the second sample will include the second label. Finally, the evaluation apparatus 170 can generate the training dataset by combining multiple samples.

To ensure that the predictive efficiency of the machine learning models implemented by the evaluation apparatus 170 does not decline when user-specific information is not available for example, during selection of digital components, the machine learning models are designed in a way that allows sharing of learned parameters across different tasks. This is described with reference to FIG. 2.

In some implementations, the different tasks for which the machine learning models are implemented can be different levels of personalization while selecting digital components. For example, the evaluation apparatus 170 can implement two machine learning models where the first machine learning model is based solely on a training dataset that includes the first set of data that is related to the multiple user groups. This enables the first machine learning model to predict labels that generalize the selection of digital components across all users of each user group. On the flip side, the second machine learning model can be trained on a training dataset that includes the first set of data that is related to the multiple user groups and the second set of data that includes user-specific data thereby enabling the second machine learning models to predict labels that are specific to each of the users of the user groups. The predicted user-specific labels can then be used to select digital components that can provide a better user-experience.

FIG. 2 shows an example machine learning model implemented by the evaluation apparatus 170 to select digital components. In general, a machine learning model can be any machine learning technique deemed suitable for the specific implementation, such as an artificial neural network (ANN), support vector machines (SVM), random forests (RF) etc., that includes multiple trainable parameters. During the training process, the multiple training parameters are adjusted while iterating over the multiple samples of the training dataset (a process referred to as optimization) based on the error generated by the loss function. The loss function compares the predicted values of the machine learning model against the true value of the samples in the training set to generate a measure of prediction error.

In this example, the machine learning model 200 is a neural network based model that includes a base machine learning model 225 that further includes shared feature embeddings block 210 and shared hidden neural network block 220. The machine learning model 200 further includes three task-specific machine learning models 230A-C. The shared feature embedding block 210 and the shared hidden neural network block 220 each includes one or more neural network layers that includes a multiple of training parameters that can be adjusted during the training process to minimize the error generated by the loss function of the machine learning model to learn complex relationships that represent user preferences for digital components. For example, the shared feature embedding block 210 processes the features that are provided as input to project them into an embedding space that allows for a more efficient information representation. The shared hidden neural network block 220 is configured to process the output of the feature embedding block 210 to learn concepts such as the relationship between digital components, user groups and user activity history. Finally, each of the task-specific machine learning models 230A-C includes multiple neural network layers that further includes a multiple training parameters that can be adjusted during the training process to further learn user preferences at different levels of personalization.

While training the machine learning model 200, the shared feature embedding block 210 can iteratively process each training sample of the training dataset to generate as output, a corresponding embedding vector that is an intermediate representation of the training samples that is further processed by the shared hidden neural network block 220 to generate an encoded representation of the embedding vector. The task-specific machine learning model 230A-C receives the encoded representation of the embedding vector from the shared hidden neural network block 220 and generates as output an indication that can be used to select digital components. For example, the task-specific machine learning model 230A can be a classification model that classifies the training sample into a predetermined category that is associated to a class of digital components among the multiple classes of digital components. For example, digital components that are contextually related to "travelling" can further be classified into "Hotels", "Rental cars", "Travel tickets" etc. Note that, these classes can also be considered as labels if the task-specific machine learning model 230A generates labels for each of the corresponding training samples.

The machine learning model 200 in order to learn the relationship between the true classes and each of the corresponding input training samples, compares the predicted classes with the label of the corresponding training sample of the training dataset using a loss function. Based on a loss value computed using the loss function, the parameters of the task-specific machine learning models 230A, the shared hidden neural network block 220 and the shared feature embedding block 210 are adjusted. This training process is executed iteratively for all the training samples of the training dataset until the loss value computed using the loss function is below a pre-specified threshold.

In some implementations, while training other task-specific machine learning models such as 230B or 230C, the training process can only adjust the parameters of the task-specific machine learning models 230B or 230C. For example, assume that the task-specific machine learning model 230A has been trained along with the shared hidden neural network block 220 and the shared feature embedding block 210. While training the task-specific machine learning model 230B, the evaluation apparatus 170 can choose to adjust only the parameters of the task-specific machine learning model 230B based on a loss function that can be different from the loss function used while training the task-specific machine learning model 230A. In such an implementation, the parameters of the shared hidden neural network block 220 and the shared feature embedding block 210 that were previously adjusted while training the model 230A are used to generate the encoded representation of the training samples that is further provided as input to the task-specific machine learning model 230B that further classifies the encoded representation into one of the pre-specified classes.

In some implementations, the shared hidden neural network block 220 and the shared feature embedding block 210 can be trained to compress the input into an encoded representation so as to reduce the memory requirement of the machine learning model 200. In such an implementations, the base machine learning model 225 that includes the shared hidden neural network block 220 and the shared feature embedding block 210 can be trained as an autoencoder model that imposes a bottleneck that forces a compressed representation of the input 205 and by adjusting the parameters of the shared hidden neural network block 220 and the shared feature embedding block 210. After training the base machine learning model 225, the parameters of the shared hidden neural network block 220 and the shared feature embedding block 210 are kept constant while training the task-specific machine learning models.

Once the machine learning model 200 is trained, the digital component distribution system 110 can select digital components based for distribution to the client devices. For example, assume that a male user belonging to the user group "Travelling", provides a search query through the client device 106 to obtain a search results page and/or data specifying search results and/or textual, audible, or other visual content that is related to the search query. Assume that the search results page includes a slot for digital components provided by entities other than the entity that generates and provides the search results page. The browser based application 107 executing on the client device 106 generates a component request 112 for the digital component slot. The digital component distribution system 110 after receiving the component request 112, provides the information included in the component request 112 including the user group identifier of the user group "Travelling", the geographic information indicating a state or region from which the component request 112 was submitted, or other information that provides context for the environment in which the digital component 112 will be displayed (e.g., a time of day of the component request, a day of the week of the component request, a type of client device 106 at which the digital component will be displayed, such as a mobile device or tablet device) to the machine learning model 200 that is implemented by the user evaluation apparatus 170. The machine learning model 200 after processing the input, generates, as output, predicted labels and/or class of digital components that can be transmitted to the client device 106 of the user. The digital component distribution system 110 can select digital components that have same labels or fall into the same class as the predicted class and transmits the selected digital component to the client device 106.

FIG. 3 is a flow diagram of an example process 300 of generating training samples of the training dataset and training a machine learning model. Operations of process 300 are described below as being performed by the components of the system described and depicted in FIG. 1. Operations of the process 300 are described below for illustration purposes only. Operations of the process 300 can be performed by any appropriate device or system, e.g., any appropriate data processing apparatus. Operations of the process 300 can also be implemented as instructions stored on a computer readable medium, which can be non-transitory. Execution of the instructions cause one or more data processing apparatus to perform operations of the process 300.

The evaluation apparatus 170 identifies a first set of data for the user group that includes attributes of the user group (310). For example, the evaluation apparatus 170 can identify the multiple user groups maintained and/or managed by the digital component distribution system 110 and a first set of data regarding each of the user groups among the multiple user groups. The first set of data for the user groups can include user group attributes such as the number of users in the user groups, the geographical locations of the client devices 106 of the users of the user groups, a set (or a list of URLs) of digital contents that are commonly accessed by the users of the user groups etc. The first set of data can further include the distribution of users based on certain user characteristics such as gender, income group, educational qualification that may have been obtained or predicted by other machine learning models implemented by the digital component distribution system 110. The first set of data can further include along with various signals derived from the user group identifier such as the average characteristics or aggregate behavioral statistics of users within the group, and/or other information that provides context for the environment in which the digital component 112 will be displayed (e.g., a time of day of the component request, a day of the week of the component request, a type of client device 106 at which the digital component will be displayed, such as a mobile device or tablet device).

The evaluation apparatus 170 obtains first party user identifiers for the multiple users of the user group (320). For example, the evaluation apparatus 170 can obtain user identifiers for each of the users in each user group among the multiple user groups. These user identifiers can be first party user identifiers such as email identifiers or phone numbers that the user willingly provides to the digital component distribution system 110 in lieu of digital content and/or services provided by digital component distribution system 110.

The evaluation apparatus 170 identifies a second set of data describing online activity of users (330). For example, the evaluation apparatus 170 can obtain a second set of data such as online activity that can include digital content accessed by the user, the prior digital components distributed to the client device of the users and performance of user actions such as clicking and/or selecting digital components. The second set of data can further include user-specific information such as age, gender, level of education etc that were provided by the users of each user group among the multiple user groups.

The evaluation apparatus 170 performs a contextual analysis of the first set of data for the user group and the second set of data for the user to generate one or more labels indicating a category of interest of the user (340). The evaluation apparatus 170 can use natural language processing (NLP) to process the digital contents accessed by the user based the user's online activity and the digital contents commonly accessed by the users of the user group to generate labels that indicate user interest. For example, the labels generated by the evaluation apparatus 170 for a user assigned to a user group "Travelling" can be "Destination1" indicating that the user is interested in travelling to a particular destination1. The evaluation apparatus 170 can also generate other labels that can indicate user interest in other travel destinations, hotels or car rentals The evaluation apparatus 170 generates training samples for each user in the user group (350). The evaluation apparatus 170 can generate training samples where each training sample corresponds to a particular user and can include the corresponding first set of data, the corresponding second set of data and one of the labels generated by the evaluation apparatus 170. For example, if for a particular user, the evaluation apparatus generates two labels, the evaluation apparatus 170 can generate two training samples where the first sample will include the first of the two labels and the second sample will include the second label. Finally, the evaluation apparatus 170 can generate the training dataset by combining the training samples (360).

The evaluation apparatus 170 train a machine learning model (370). For example, the machine learning model 200 is a neural network based model that includes a base machine learning model 225 that further includes shared feature embeddings block 210 and shared hidden neural network block 220. The machine learning model 200 also includes three task-specific machine learning models 230A-C.

While training the machine learning model 200, the shared feature embedding block 210 can iteratively process each training sample of the training dataset to generate as output, a corresponding embedding vector that is further processed by the shared hidden neural network block 220. The task-specific machine learning model 230A-C receives the encoded representation of the embedding vector from the shared hidden neural network block 220 and generates as output an indication that can be used to select digital components. The machine learning model 200 in order to learn the relationship between the true classes and each of the corresponding input training samples, compares the predicted classes with the label of the corresponding training sample of the training dataset using a loss function. Based on a loss value computed using the loss function, the parameters of the task-specific machine learning models 230A, the shared hidden neural network block 220 and the shared feature embedding block 210 are adjusted. This training process is executed iteratively for all the training samples of the training dataset until the loss value computed using the loss function is below a pre-specified threshold.

While training other task-specific machine learning models such as 230B or 230C, the training process can only adjust the parameters of the task-specific machine learning model 230B or 230C. For example, assume that the task-specific machine learning model 230A has been trained along with the shared hidden neural network block 220 and the shared feature embedding block 210. While training the task-specific machine learning model 230B, the evaluation apparatus 170 can choose to adjust only the parameters of the task-specific machine learning model 230B based on a loss function that can be different from the loss function used while training the task-specific machine learning model 230A. In such situations, the parameters of the shared hidden neural network block 220 and the shared feature embedding block 210 that were previously adjusted while training the model 230A are used to generate the encoded representation of the training samples that is further provided as input to the task-specific machine learning model 230B that further classifies the encoded representation into one of the pre-specified classes.

The shared hidden neural network block 220 and the shared feature embedding block 210 can be trained to compress the input into an encoded representation so as to reduce the memory requirement of the machine learning model 200. In such situations, the base machine learning model 225 can be trained as an autoencoder model that imposes a bottleneck that forces a compressed representation of the input 205 and by adjusting the parameters of the shared hidden neural network block 220 and the shared feature embedding block 210. After training the base machine learning model 225, the parameters of the shared hidden neural network block 220 and the shared feature embedding block 210 are kept constant while training the task-specific machine learning models.

FIG. 4 is a flow diagram of an example process 400 of selecting and distributing digital components. Operations of process 400 are described below as being performed by the components of the system described and depicted in FIG. 1. Operations of the process 400 are described below for illustration purposes only. Operations of the process 400 can be performed by any appropriate device or system, e.g., any appropriate data processing apparatus. Operations of the process 400 can also be implemented as instructions stored on a computer readable medium, which can be non-transitory. Execution of the instructions cause one or more data processing apparatus to perform operations of the process 400.

In this example, it is assumed that the evaluation apparatus 170 has implemented a machine learning model for predicting user interests by deploying a trained machine learning model according to the descriptions of FIG. 1-3. In addition, a user for which a digital component is being requested has been assigned to a user group.

The digital component distribution system 110 receives a request for digital component (410). For example, the user of the client device 106 uses a browser based application 107 to load a resource such as a website that includes a digital component slot. The browser application 107 after loading the website can transmit a request for digital component to the digital component distribution system 110.

The digital component distribution system 110 obtains the user group identifier of the user group to which the user of the client device 106 was assigned (420). For example, after receiving the request for digital component, the digital component distribution system 110 can transmit a request for user group identifier to the client device 106. In response to receiving the request for user group identifier, the client 106 can transmit the user group identifier to the digital component distribution system 110. In some implementations, the client 106 can transmit the user group identifier along with the request for digital component to reduce redundant communication between the client device 106 and digital component distribution system 110.

The digital component distribution system 110 determines the machine learning model to be used for predicting user interest (430). As explained before, the evaluation apparatus 170 can implement one or more multiple machine learning models where each machine learning model is trained for predicting user interest at a different level of personalization. In another implementation, the evaluation apparatus 170 can implement a single machine learning model (as explained with reference to FIG. 2) that further includes two or more task-specific machine learning models (230A-C) where each task-specific machine learning model is trained to predict user interest at a different level of personalization.

In some implementations, while predicting user interest (for e.g., a label indicating user interest), the digital component distribution system 110 can provide the user group identifier of the user group received along with the request for digital component as input to the selected machine learning model. For example, the digital component distribution system 110 can select a machine learning model (or a task-specific machine learning model) trained specifically to process user group identifiers to generate a label indicating user interest.

In some implementations, the digital component distribution system 110 can obtain the first set of data of the user group to which the user of the client device 106 is a member and/or the data corresponding to user's online activity. Depending upon the first set of data and/or the user's online activity, the digital component distribution system 110 can determine which machine learning model (or a task-specific machine learning model) to select for predicting user interest. For example, if the user's online activity is less than a pre-specified threshold, the digital component distribution system 110 can determine to use only the first set of data to predict user interest. In other words, due to the scarcity of input data at the time of prediction, the digital component distribution system 110 can determine to use a machine leaning model that generalizes over all users in the user group. On the other hand, if the user's online activity is more than the pre-specified threshold, the digital component distribution system 110 can determine to use the first set of data to predict user interest and the user's online activity to predict user interest. In such a situation due to the availability of input data, the digital component distribution system 110 can determine to use a machine learning model that predicts user interest that is more personalized for the user.

In some implementation, the content provider 104 that is providing the resource to the client device 106 can direct the digital component distribution system 110 to use a particular task-specific machine learning model. In another implementation, the user of the client device 106 can provide instructions to the content server 104 or the digital component distribution system 110 to select a particular task-specific machine learning model. For example, the user of the client device 110 can store user preferences into the browser regarding the level of personalization the user wants that is transmitted to the digital component distribution system 110 along with request for digital component.

The digital component distribution system 110 predicts user interest of the user of client device 106 (440). For example, after selecting the particular task-specific machine learning model, the digital component distribution system 110 can provide as input to the selected task-specific machine learning model, the first set of data of the user group to which the client device 106 of the user is a member and/or the user's online activity. The selected task-specific machine learning model processes the input and generates as output a label indicating user interest or classifies the user into one of the predetermined classes that also indicates user interest.

The digital component distribution system 110 selects digital components based on the user interest (450). For example, the digital component distribution system 110 can maintain a catalog of digital components or can communicate with multiple digital component providers 108 to select digital components based on the user interest predicted by the selected task-specific machine learning model.

The digital component distribution system 110 transmits the selected digital component to the client device (460). For example, after selecting the digital component based on the predicted user interest, the digital component distribution system 110 transmits the selected digital component to the client device 106 where the selected digital component is presented in the digital component slot along with the resource.

Figure 5:
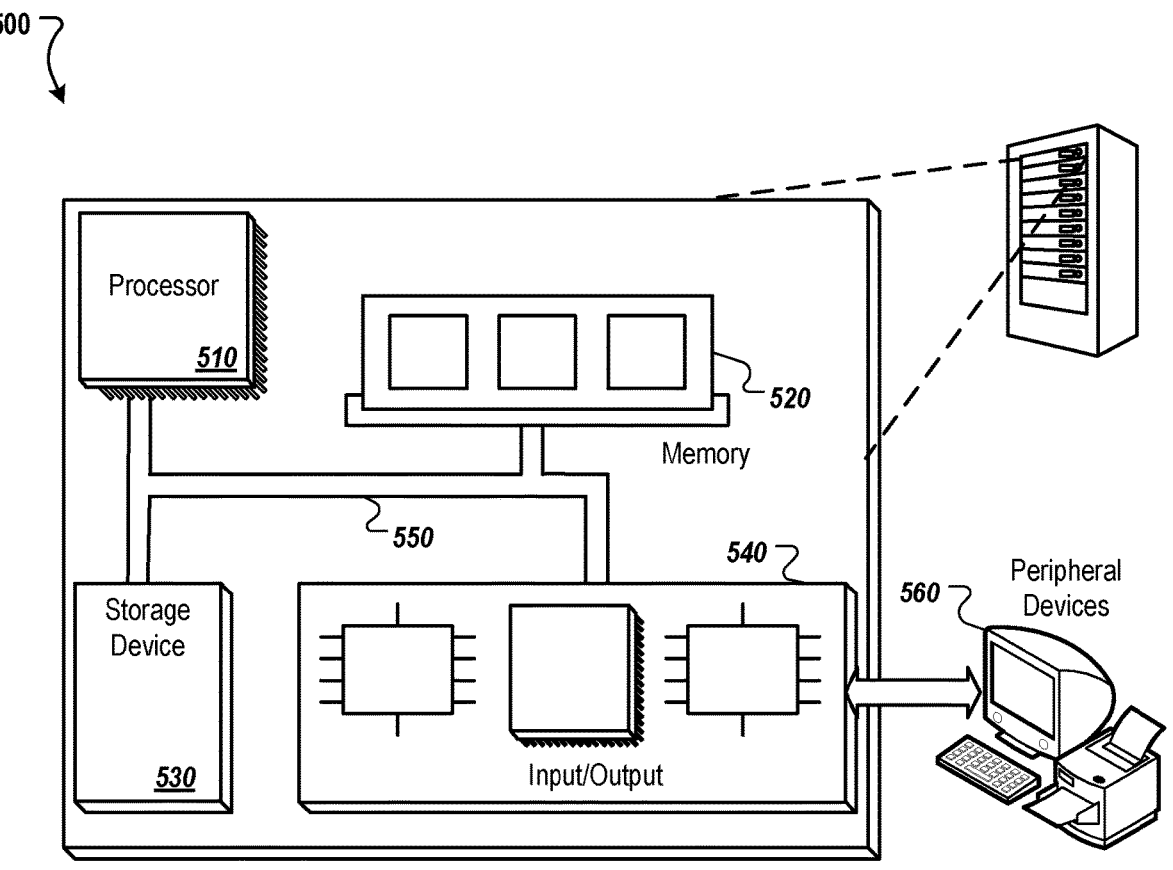
FIG. 5 is a block diagram of an example computer system.

FIG. 5 is block diagram of an example computer system 500 that can be used to perform operations described above. The system 500 includes a processor 510, a memory 520, a storage device 530, and an input/output device 540. Each of the components 510, 520, 30, and 540 can be interconnected, for example, using a system bus 550. The processor 510 is capable of processing instructions for execution within the system 500. In one implementation, the processor 510 is a single-threaded processor. In another implementation, the processor 410 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 570. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
identifying, for each user group of a plurality of user groups that each include multiple users classified as having similar interests, a first set of data comprising a first set of attributes of the user group;
for each user group of the multiple user groups:
obtaining first party user identifiers for the multiple users of the user group, wherein the first party user identifier for an individual user identifies the individual user to a first party content provider;
identifying, for each user in the user group, a second set of data describing activity of the user with respect to content of the first party content provider;
performing, for each user in the user group, a contextual analysis of the first set of data for the user group and the second set of data for the user, thereby generating one or more labels indicating a category of interest of the user; and
generating one or more training samples for each user in the user group, the generating comprising, for each label of the one or more labels for each user in the user group, combining at least a portion of the first set of data for the user group, the second set of data for the user, and the label;
generating a training dataset comprising the one or more training samples for each user in each of the multiple user groups;
training, using the training dataset, to generate a trained machine learning model comprising (1) a base machine learning model configured to generate an encoded representation of the training samples, and (2) one or more task-specific machine learning models configured to receive as input, the encoded representation of the training samples and generate, as output, one or more output labels that each indicate an aggregated interest for the users in the user group;
receiving, from a client device of a given user, a digital component request, wherein the digital component request includes a given user group identifier of a given user group that includes the given user as a member;
identifying a set of attributes for the given user group;
providing the set of attributes for the given user group as input to the machine learning model;
generating, using the trained machine leaning model, an output label that indicates an interest of the given user of the client device;
selecting one or more digital components based on the output label of the given user; and
transmitting the one or more digital components to the client device.

2. The computer-implemented method claim 1, wherein the first set of data includes digital content accessed by the multiple users of each of the plurality of user groups.

3. The computer-implemented method of claim 1, wherein the second set of data for each of the multiple users of the plurality of user groups comprises data indicating online activity of the user and user characteristics provided by each of the users to a first party content provider that provides digital content to the users.

4. The computer-implemented method of claim 1, wherein training the machine learning model comprises:

training the base machine learning model on the training dataset to generate a set of features that is an intermediate representation of the first set of features and the second set of features; and training each of the one or more task-specific machine learning models for selecting digital components based on the set of features at different levels of accuracy.

5. The computer-implemented method of claim 4, wherein training each of the task-specific machine learning models comprises providing the set of features generated by the base machine learning model as input to each of the task-specific machine learning models.

6. The computer-implemented method of claim 4, wherein each task-specific machine learning model is trained on a different loss function corresponding to a different level of content personalization than each other task-specific machine learning model.

7. A system comprising:

one or more processors; and one or more storage devices storing instructions that, when executed by the one or more processors, cause the one or more processor to perform operations comprising:

identifying, for each user group of a plurality of user groups that each include multiple users classified as having similar interests, a first set of data comprising a first set of attributes of the user group;

for each user group of the multiple user groups:

obtaining first party user identifiers for the multiple users of the user group, wherein the first party user identifier for an individual user identifies the individual user to a first party content provider;

identifying, for each user in the user group, a second set of data describing activity of the user with respect to content of the first party content provider;

performing, for each user in the user group, a contextual analysis of the first set of data for the user group and the second set of data for the user, thereby generating one or more labels indicating a category of interest of the user; and generating one or more training samples for each user in the user group, the generating comprising, for each label of the one or more labels for each user in the user group, combining at least a portion of the first set of data for the user group, the second set of data for the user, and the label;

generating a training dataset comprising the one or more training samples for each user in each of the multiple user groups;

training, using the training dataset, to generate a trained machine learning model comprising (1) a base machine learning model configured to generate an encoded representation of the training samples, and (2) one or more task-specific machine learning models configured to receive as input, the encoded representation of the training samples and generate, as output, one or more output labels that each indicate an aggregated interest for the users in the user group;

receiving, from a client device of a given user, a digital component request, wherein the digital component request includes a given user group identifier of a given user group that includes the given user as a member;

identifying a set of attributes for the given user group;

providing the set of attributes for the given user group as input to the machine learning model;

generating, using the trained machine leaning model, an output label that indicates an interest of the given user of the client device;

selecting one or more digital components based on the output label of the given user; and transmitting the one or more digital components to the client device.

8. The system of claim 7, wherein the first set of data includes digital content accessed by the multiple users of each of the plurality of user groups.

9. The system of claim 7, wherein the second set of data for each of the multiple users of the plurality of user groups comprises data indicating online activity of the user and user characteristics provided by each of the users to a first party content provider that provides digital content to the users.

10. The system of claim 7, wherein training the machine learning model comprises:

training the base machine learning model on the training dataset to generate a set of features that is an intermediate representation of the first set of features and the second set of features; and training each of the one or more task-specific machine learning models for selecting digital components based on the set of features at different levels of accuracy.

11. The system of claim 10, wherein training each of the task-specific machine learning models comprises providing the set of features generated by the base machine learning model as input to each of the task-specific machine learning models.

12. The system of claim 10, wherein each task-specific machine learning model is trained on a different loss function corresponding to a different level of content personalization than each other task-specific machine learning model.

13. A computer readable medium storing instructions that, when executed by one or more data processing apparatus, cause the one or more data processing apparatus to perform operations comprising:

identifying, for each user group of a plurality of user groups that each include multiple users classified as having similar interests, a first set of data comprising a first set of attributes of the user group;

for each user group of the multiple user groups:

obtaining first party user identifiers for the multiple users of the user group, wherein the first party user identifier for an individual user identifies the individual user to a first party content provider;

identifying, for each user in the user group, a second set of data describing activity of the user with respect to content of the first party content provider;

performing, for each user in the user group, a contextual analysis of the first set of data for the user group and the second set of data for the user, thereby generating one or more labels indicating a category of interest of the user; and generating one or more training samples for each user in the user group, the generating comprising, for each label of the one or more labels for each user in the user group, combining at least a portion of the first set of data for the user group, the second set of data for the user, and the label;

generating a training dataset comprising the one or more training samples for each user in each of the multiple user groups;

training, using the training dataset, to generate a trained machine learning model comprising (1) a base machine learning model configured to generate an encoded representation of the training samples, and (2) one or more task-specific machine learning models configured to receive as input, the encoded representation of the training samples and generate, as output, one or more output labels that each indicate an aggregated interest for the users in the user group;

receiving, from a client device of a given user, a digital component request, wherein the digital component request includes a given user group identifier of a given user group that includes the given user as a member;

identifying a set of attributes for the given user group;

providing the set of attributes for the given user group as input to the machine learning model;

generating, using the trained machine leaning model, an output label that indicates an interest of the given user of the client device;

selecting one or more digital components based on the output label of the given user; and transmitting the one or more digital components to the client device.

14. The computer readable medium of claim 13, wherein the first set of data includes digital content accessed by the multiple users of each of the plurality of user groups.

15. The computer readable medium of claim 13, wherein the second set of data for each of the multiple users of the plurality of user groups comprises data indicating online activity of the user and user characteristics provided by each of the users to a first party content provider that provides digital content to the users.

16. The computer readable medium of claim 13, wherein training the machine learning model comprises:

training the base machine learning model on the training dataset to generate a set of features that is an intermediate representation of the first set of features and the second set of features; and training each of the one or more task-specific machine learning models for selecting digital components based on the set of features at different levels of accuracy.

17. The computer readable medium of claim 16, wherein training each of the task-specific machine learning models comprises providing the set of features generated by the base machine learning model as input to each of the task-specific machine learning models.

* * * * *